No. 693,159. Patented Feb. 11, 1902.
V. E. RUMBARGER.
MEANS FOR EXPANDING THE TUBES OF BICYCLE PARTS AND SECURING SAME.
(Application filed Oct. 30, 1899.)
(No Model.)
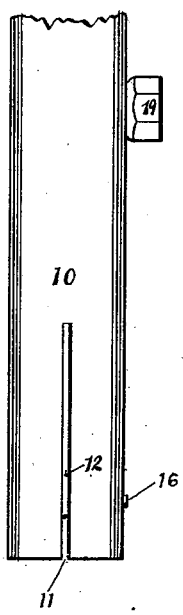
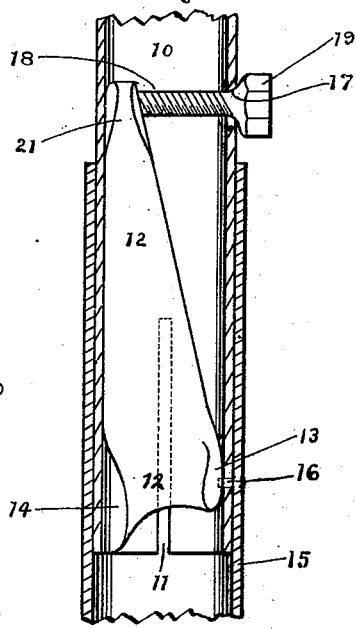
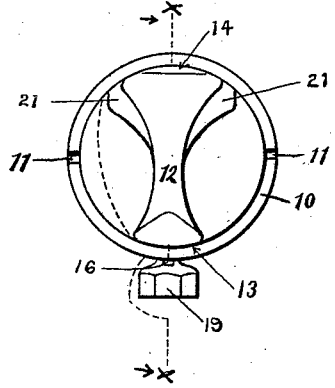
Witnesses
W. D. Riddell
K. E. Koehne
Inventor.
Victor E. Rumbarger
By _____
His Attorney.

UNITED STATES PATENT OFFICE.

VICTOR E. RUMBARGER, OF DAYTON, OHIO.

MEANS FOR EXPANDING THE TUBES OF BICYCLE PARTS AND SECURING SAME.

SPECIFICATION forming part of Letters Patent No. 693,159, dated February 11, 1902.

Application filed October 30, 1899. Serial No. 735,312. (No model.)

*To all whom it may concern:*

Be it known that I, VICTOR E. RUMBARGER, of Dayton, county of Montgomery, and State of Ohio, have invented a certain new and useful Improvement in Means for Expanding the Tubes of Bicycle Parts and Securing the Same; and I do hereby declare that the following is a clear, full, and exact description thereof, reference being had to the accompanying drawings, in which like numerals refer to like parts.

My invention relates to a new and useful improvement in means for expanding tubes of bicycle and others and securing the same; and it consists of the combinations and subcombinations of the various parts and the means, all as hereinafter described, and more particularly stated in the claims.

In the drawings I have illustrated the best form to me now known for accomplishing the objects of my invention; but I do not desire to be limited to the specific means there shown.

In said drawings, Figure 1 illustrates a side elevation view of an expanding-tube embodying and containing my invention. Fig. 2 is a sectional elevation view thereof on line X X of Fig. 3, showing the tube in which said expanding-tube is secured. Fig. 3 is an enlarged bottom plan view of the parts shown in Fig. 1. Fig. 4 is a sectional view of the upper end of the tube-expanding lever to show the curved or oblong threaded opening therethrough.

In said drawings, 10 represents the expanding-tube, provided with one or more slots 11 extending from one end of said tube. Mounted within the bore of said tube 10 is a lever 12, having, in the instance shown in Figs. 2 and 3, the curved faces 13 and 14 integral with the lower end thereof, said curved faces 13 and 14 extending in said instance lengthwise of said lever 12 and being at different points in the length of said lever, said curved faces 13 and 14 also substantially fitting the bore of said tube 10, so that when the relatively thinner upper end of said lever 12 is moved substantially at right angles with the length of tube 10 said curved faces 13 and 14 expand the slotted end of said tube 10 to clamp said tube 10 within the tube 15 for the purpose of securing said tubes 10 and 15 together conveniently at desirable points. Further than this it is not necessary that tube 10 be slotted, as said lever 12 will extend the same to make it oval in shape, and thus secure the same in the outer tube 15; but I prefer to slot the said tube 10 in order that the same will be elastic enough to return to its original position when lever 12 is released.

In the instance shown in Figs. 1, 2, and 3 the curved face 13 is provided with a recess into which projects a pin 16, extending through or projecting from one side of the tube 10 for the purpose of centering said curved face 13, and when said face 13 is integral with lever 12 said pin regulates and fixes the fulcrum-point about which said lever 12 turns in contacting with the bore of tube 10. The end of said lever 12 opposite that end carrying said curved faces 13 and 14 is here for convenience termed the "upper" end, and it is provided with suitable operating means passing through an opening 17 in one wall of said tube 10 at a distance from said slotted portion thereof and at substantially right angles to said slots 11 therein, so that said lever 12 may be readily operated from without the tube 10. In the instance shown in the drawings said operating means consists of a screw 18, having a suitable head 19, adapted for a wrench or screw-driver or with a flattened head to be operated by the fingers. Said screw 18 passes through opening 17 in the side of tube 10 and engages in a screw-threaded opening 20 in the upper end 21 of lever 12, which end 21 is less in width than the diameter of the bore of tube 10, and to accommodate the varying arcs of said lever 12 in operating to expand the slotted end of tube 10 I form said screw-threaded opening 20 oblong or curved, substantially as shown in Fig. 4, while the edges of said opening 17 are tapered, and in the instance shown in Fig. 2 the taper of said opening 17 is outward to receive the tapering portion of said screw 18 immediately beneath its head 19, the largest diameter of said opening 17 being upon the outer surface of said tube 10.

Having now so fully and clearly described my invention as to enable those skilled in the art to freely make and use the same when this exclusive grant shall cease to operate, what I claim, and desire to secure by Letters Patent, is—

1. In a tube-expander, the combination of a tube having a series of slots therein, a lever within said tube carrying curved faces on opposite sides of its end adjacent said slotted portion of said tube, said curved faces conforming substantially to the bore of said tube and engaging said tube at different points in the length of said lever, the upper end of said lever being less in thickness than the diameter of the bore of said tube, and means for bodily moving said lever about its fulcrum-point and laterally with reference to the axis of said tube, substantially as specified.

2. In a tube-expander, the combination of a tube having a slot therein, a lever fulcrumed within said tube, the fulcrum-axis of said lever being substantially at right angles to the length of said tube, curved portions engaging the bore of said tube within the length of said slot, and means for moving one end of said lever laterally with reference to said tube thus moving said curved portions outward to expand said tube, substantially as specified.

3. A tube-expander consisting of a lever having thick and thin opposite ends, bearing-faces on opposite sides of said thick end, said lever having a fulcrum-axis intersecting the plane of one of said bearing-faces, and means for connecting an operating member to said thin end of said lever, substantially as specified.

4. A tube-expander consisting of a lever having faces on opposite sides of one end adapted to engage the walls of the tube, said faces being at different points in the length of said lever, one of said faces being substantially rocker-shaped, and the fulcrum-axis of said lever being at said substantially rocker-shaped surface, substantially as specified.

5. A tube-expander consisting of a lever having curved faces on opposite sides of one end and extending lengthwise of said lever, said faces being at different points in the length of said lever, said lever having a relatively narrow opposite end, and an opening in said relatively thin end at an angle to the length of said lever, substantially as specified.

6. In a tube-expander, the combination of a tube, bearing members within a tube and adapted to contact with opposite sides of the bore of said tube, a lever between and actuating said bearing members having one end extending beyond said bearing members, and means for oscillating said lever about the axis transverse to the longitudinal axis of said tube to effect or release the binding action of said bearing parts, substantially as specified.

7. In a tube-expander, the combination of a tube, a lever within said tube, curved portions connected to said lever at different portions in its length, said curved portions being adapted to fit the bore of said tube, means for operating said lever within said tube, the operating end of said lever being thinner than the diameter of the bore of said tube, and a projection from the bore of said tube for fixing the point of contact between one of said curved faces and the bore of said tube, substantially as specified.

8. In a tube-expander, the combination of a tube, a lever within said tube, and fulcrumed on an axis substantially at right angles to the length of said tube, curved portions upon opposite sides of one end of said lever, and at different points in the length of said lever, said curved portions being adapted to fit within the bore of said tube, and a projection for fixing the point of contact between one of said faces and the bore of said tube, substantially as specified.

9. In a tube-expander, the combination of a tube, a lever within said tube, curved portions upon opposite sides of one end of said lever, and at different points in the length of said lever, said curved portions being adapted to fit within the bore of said tube, a recess in one of said curved portions, a projection from the bore of said tube and occupying said recess, and means for bodily moving said lever substantially at right angles to the axis of said tube, substantially as specified.

10. In a tube-expander, the combination of a tube, a lever within said tube, and fulcrumed on an axis substantially at right angles to the length of said tube, curved portions upon opposite sides of one end of said lever, and at different points in the length of said lever, said curved portions being adapted to fit within the bore of said tube, an opening through said tube at an angle to the bore of said tube, said opening being adjacent the end of said lever opposite that end having said curved portions, and an operating member at substantially right angles to the axis of said tube and passing through said opening and connecting with said lever, whereby said lever within said tube may be operated from a point without said tube, substantially as specified.

11. In a tube-expander the combination of a tube, a lever within said tube, curved portions upon opposite sides of one end of said lever, and fitting within the bore of said tube, an opening through the side of said tube adjacent the end of said lever opposite that end having said curved portions, a headed screw passing through said opening and engaging with a screw-threaded opening in said adjacent end of said lever, for operating said lever from a point without said tube, said end of said lever having said opening therethrough being narrower than said curved ends permitting said narrow end of said lever to be moved laterally within said tube, substantially as specified.

12. The combination with two telescoping tubular parts, the inner tube projecting from the other of a thin and thick ended clamping-lever extending longitudinally within said parts and bearing at its thick end against opposing portions thereof to cause said parts to bind on each other, an operating member for oscillating said lever about an axis transverse to the tubular parts to effect or release said binding action, said operating member passing through an opening in the wall of said inner tubular part, at a point beyond the other tubular part and loosely connecting with the thin end of said lever, said opening being of different diameters and engaging a portion of said operating member of substantially corresponding different diameters, substantially as specified.

13. The combination with two telescoping tubular parts, of a clamping-lever extending longitudinally within said parts and bearing against opposing portions thereof to cause said parts to bind on each other, and means for oscillating said lever about an axis transverse to the tubular parts to effect or release the binding action, substantially as described.

In witness whereof I have hereunto set my hand this 27th day of October, 1899.

VICTOR E. RUMBARGER.

Witnesses:
LEVI D. HELLER,
IRA C. KOEHNE.